A. G. DAY.
Dry Amalgamator.
No. 50,101. Patented Sept. 26, 1865.
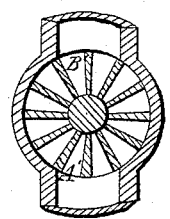
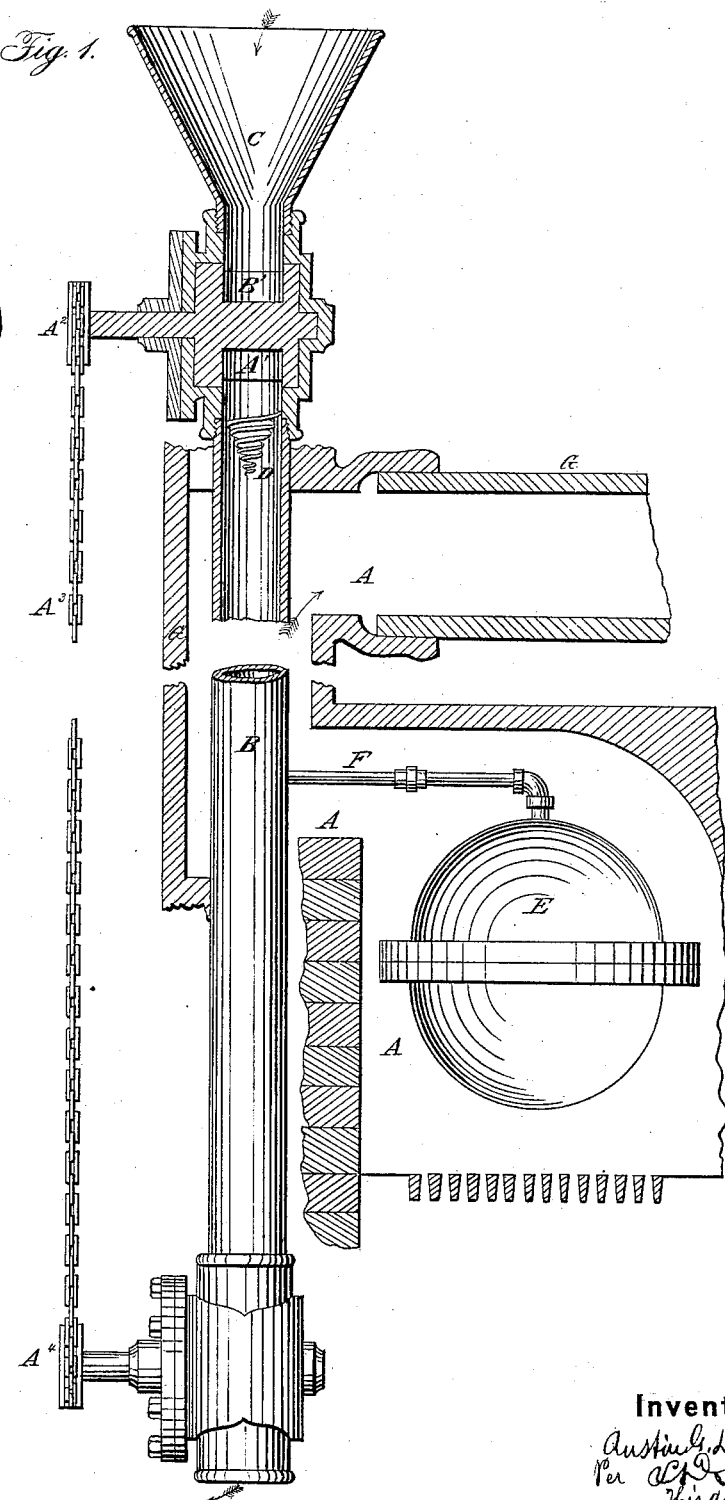
Witnesses:
A. Van Buskirk
James I. Rogers
Inventor:
Austin G. Day
Per L. D. Gale
His attorney

UNITED STATES PATENT OFFICE.

AUSTIN G. DAY, OF NEW YORK, N. Y.

IMPROVED AMALGAMATOR.

Specification forming part of Letters Patent No. 50,101, dated September 26, 1865.

*To all whom it may concern:*

Be it known that I, AUSTIN G. DAY, of the city, county, and State of New York, have invented certain new and useful Devices for Perfecting the Amalgamation of the Precious Metals where heat is used; and I hereby declare that the following is a full and sufficient description thereof, reference being had to the accompanying drawings and references thereof.

The nature of the invention consists in the arrangement of certain tubes or pipes with suitable shield or jacket apparatus for preserving the temperature of the amalgamating-vessel and the tubes or pipes connected therewith, so that the ore of the precious metal may be heated to and preserved at the temperature at which quicksilver becomes a vapor.

Where the amalgamation of gold and silver is produced by the means of mercurial vapor instead of the metal in the liquid state, it becomes necessary to elevate the temperature of the ore to near the vaporizing point of the mercury, and at the same time to heat up the mercury till it vaporizes freely, (or to the temperature of 660° Fahrenheit, or thereabout,) and to preserve the two uniformly at the same heat, or nearly.

The elevation of the heat to the necessary temperature and sustaining of the same constitute the design of the devices now to be described.

The devices to be used are—

First. A heating-vessel, which may be a cylinder, either vertical, inclined, or horizontal, or it may be an ovoid or any other shaped vessel, of iron or of mason-work, capable of being heated by means of a flue or of direct heat by means of fuel placed around said heating and amalgamating vessel.

Second. It is obvious that the form and position of the jacket or shield must vary with the form and position of the heating and amalgamating vessel, and any one skilled in the art of mason and metal working would adapt the jacket to the amalgamating and heating vessel without claiming any invention therefor. In the present case, for the purpose of illustration, one form of heater (the cylinder in the vertical position) is here represented. If it were inclined or horizontal the external heat would, as now, enter the lower part of the surrounding space of the cylinder and travel the entire length of the vessel, or a portion only, and in which the amalgamation is effected.

Third. The pipe F, for carrying the mercurial vapor from the retort or still over a separate fire, or the same fire used to heat up the amalgamating-vessel, is carried through the jacket-space to the upper or that part of the inside of the heating and amalgamating vessel B where the charge of metalliferous mineral is received, whether it fall in a shower, is lifted by buckets or flanges, or by the cylindrical screw-thread.

Fourth. The jacket-space is heated by a flue, as in the representation herewith, or with fuel, as stated above and referred to in Figs. 1 and 2, except that in Figs. 1 and 2 there is no representation of the furnace and fire being arranged around cylinder B.

In the drawings, Figure 1 is a vertical view, partly in section; Fig. 2, section of feed apparatus.

Let A A A represent the flue or fire-chamber for heating the mineral and vessel for amalgamating; B, the amalgamating or heating vessel or cylinder; C, the charger, containing a rotary feed apparatus, B' A', operated by wheel $A^2$, endless chain $A^3$, working on pulley $A^4$, for discharging the contents of the cylinder into water below. The pulley $A^4$ carries a discharging apparatus like that of A' B', which serves to feed the necessary pulverized mineral. E, the retort or still for vaporizing the mercury and discharging it through F into cylinder B, where it receives the shower of mineral dust from hopper C, retarded on its way by the wire cage D, which distributes also the charge; F, the mercury-vapor tube for supplying the cylinder B as needed. G represents the flue discharging the smoke to chimney or its equivalent.

Now, it is presumed that the furnace which heats the mercury bath E will also heat the middle part of the cylinder B, so as to preserve the mercury in the vapor state while it receives the mineral shower from above, and retains it in contact long enough to perform the amalgamation; but if it fail to accomplish the entire work, then the remedy is to repeat the number of distributers D in the length of cylinder B, to retard the motion of the shower through the body of the cylinder.

Operation: The furnace being charged with the necessary mercury and fuel, and the hopper with the necessary ore, suitable power is applied to the wheel $A^4$ in any proper manner, and the feeding set in motion. The mercury bath will steadily deliver the vapor into the cylinder, while the shower of pulverized mineral is steadily passing through the cylinder, and thus a continuous feed and discharge is kept up throughout.

Having described the nature of the invention and the several methods of using the same, what I claim as my invention, and desire to secure by Letters Patent, is—

1. The combination of a suitable fire-chamber or furnace-flue, A A A, or its equivalent, with the amalgamating-cylinder or its equivalent, substantially in the manner and for the purpose herein set forth.

2. The feeding and discharging apparatus of the cylinder, in combination with the feed of mineral and vapor of metal, as set forth.

3. The distributer D, as set forth.

AUSTIN G. DAY.

Witnesses:
CH. A. SEELY,
S. D. GALE.